US011936102B2

(12) United States Patent
Wu et al.

(10) Patent No.: US 11,936,102 B2
(45) Date of Patent: Mar. 19, 2024

(54) RADIATING ELEMENT OF ANTENNA AND ANTENNA

(71) Applicant: Samsung Electronics Co., Ltd., Suwon-si (KR)

(72) Inventors: Aiguo Wu, Shenzhen (CN); Hong Fuwen, Shenzhen (CN); Zhuo Chen, Shenzhen (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 226 days.

(21) Appl. No.: 17/492,164

(22) Filed: Oct. 1, 2021

(65) Prior Publication Data

US 2022/0021108 A1 Jan. 20, 2022

Related U.S. Application Data

(63) Continuation of application No. PCT/KR2020/004411, filed on Mar. 31, 2020.

(30) Foreign Application Priority Data

Apr. 1, 2019 (CN) ........................ 201910256652.4

(51) Int. Cl.
*H01Q 1/38* (2006.01)
*H01Q 1/48* (2006.01)
*H01Q 19/10* (2006.01)

(52) U.S. Cl.
CPC ............... *H01Q 1/38* (2013.01); *H01Q 19/10* (2013.01); *H01Q 1/48* (2013.01)

(58) Field of Classification Search
CPC .. H01Q 1/10; H01Q 1/38; H01Q 1/48; H01Q 1/26; H01Q 1/36; H01Q 1/50
See application file for complete search history.

(56) References Cited

U.S. PATENT DOCUMENTS 4,513,292 A * 4/1985 Bowman ................ H01Q 9/285 343/795
5,936,587 A * 8/1999 Gudilev .................. H01Q 1/38 343/702

(Continued)

FOREIGN PATENT DOCUMENTS

CN 102437416 A 5/2012
CN 203631742 U 6/2014

(Continued)

OTHER PUBLICATIONS

Chinese Office Action dated Apr. 26, 2020, issued in Chinese Patent Application No. 201910256652.4.

(Continued)

*Primary Examiner* — Lam T Mai
(74) *Attorney, Agent, or Firm* — Jefferson IP Law, LLP

(57) ABSTRACT

The disclosure relates to a pre-$5^{th}$-Generation (5G) or 5G communication system to be provided for supporting higher data rates Beyond $4^{th}$-generation (4G) communication system, such as long term evolution (LTE). A radiating element of an antenna is provided. The radiating element includes a vibrator radiating circuit board, wherein vibrator radiating arms arranged in pairs are printed on the vibrator radiating circuit board, a width of the vibrator radiating arms is less than one-half of a wavelength, a vibrator balun circuit board, configured to support the vibrator radiating circuit board, wherein a vibrator balun is printed on the vibrator balun circuit board, a height of the vibrator balun is at least less than one-fifth of the wavelength, the vibrator balun comprises at least one first slot. Based on the disclosure, especially for a large array base station and micro base station of 5G-massive multiple-input multiple-output (MIMO), the overall performance of the antenna, such as bandwidth, isolation, gain, cross polarization, or the like, may be (Continued)

100 improved, and the volume of the antenna is reduced with relatively small performance loss.

19 Claims, 8 Drawing Sheets

(56) References Cited

U.S. PATENT DOCUMENTS

| | | | | |
|---|---|---|---|---|
| 6,239,764 | B1* | 5/2001 | Timofeev | H01Q 9/065 343/810 |
| 6,281,843 | B1* | 8/2001 | Evtioushkine | H01Q 1/38 343/815 |
| 6,950,077 | B1* | 9/2005 | Bae | H04B 1/18 343/822 |
| 9,525,212 | B2* | 12/2016 | Peng | H01Q 9/16 |
| 10,193,238 | B2 | 1/2019 | Wu et al. | |
| 10,333,200 | B2* | 6/2019 | Moon | H01Q 1/273 |
| 11,183,973 | B1* | 11/2021 | Jain | H03K 5/01 |
| 11,355,835 | B2* | 6/2022 | Park | H01Q 1/38 |
| 2002/0058483 | A1* | 5/2002 | Shinichi | H01Q 9/16 455/575.7 |
| 2002/0060645 | A1* | 5/2002 | Shinichi | H01Q 9/16 343/702 |
| 2002/0084937 | A1* | 7/2002 | Shinichi | H01Q 9/16 343/702 |
| 2005/0007292 | A1* | 1/2005 | Lee | H01Q 1/243 343/866 |
| 2005/0184909 | A1* | 8/2005 | Tchistiakov | H01Q 1/38 343/700 MS |
| 2008/0055182 | A1* | 3/2008 | Lee | H01Q 1/243 343/859 |
| 2012/0306284 | A1* | 12/2012 | Lee | H02J 50/80 307/104 |
| 2013/0187822 | A1* | 7/2013 | Shi | H01Q 19/106 343/821 |
| 2013/0214982 | A1* | 8/2013 | Dean | H01Q 9/285 343/795 |
| 2014/0132468 | A1* | 5/2014 | Kim | H01Q 9/26 343/793 |
| 2014/0132473 | A1* | 5/2014 | Isom | H01Q 1/422 343/855 |
| 2015/0381229 | A1* | 12/2015 | Tzanidis | H01Q 9/0457 455/73 |
| 2017/0062940 | A1* | 3/2017 | Cao | H01Q 1/246 |
| 2017/0294705 | A1* | 10/2017 | Khripkov | H01Q 1/38 |
| 2019/0089396 | A1* | 3/2019 | Kim | H04B 1/3805 |
| 2019/0288406 | A1* | 9/2019 | Yang | H01Q 1/36 |
| 2020/0274400 | A1* | 8/2020 | Yeo | H02J 50/80 |
| 2022/0021108 | A1* | 1/2022 | Wu | H01Q 1/38 |
| 2022/0060155 | A1* | 2/2022 | Kuo | H03F 3/245 |
| 2022/0399864 | A1* | 12/2022 | Elsayed | H03F 3/211 |

FOREIGN PATENT DOCUMENTS

| | | | |
|---|---|---|---|
| CN | 203690485 | U | 7/2014 |
| CN | 104143686 | A | 11/2014 |
| CN | 107230827 | A | 10/2017 |
| CN | 108155473 | A | 6/2018 |
| CN | 108511913 | A | 9/2018 |
| CN | 109037919 | A | 12/2018 |
| CN | 109066051 | A | 12/2018 |
| CN | 109103592 | A | 12/2018 |
| CN | 208240874 | U | 12/2018 |
| CN | 110690562 | A | 1/2020 |
| KR | 20-2015-0001023 | U | 3/2015 |
| KR | 10-1686903 | B1 | 12/2016 |
| WO | 2012/037810 | A1 | 3/2012 |
| WO | 2017/177927 | A1 | 10/2017 |

OTHER PUBLICATIONS

Chinese Office Action dated Dec. 11, 2020, issued in Chinese Patent Application No. 201910256652.4.

* cited by examiner

RADIATING ELEMENT OF ANTENNA AND ANTENNA

CROSS-REFERENCE TO RELATED APPLICATION(S)

This application is a continuation application, claiming priority under § 365(c), of an International application No. PCT/KR2020/004411, filed on Mar. 31, 2020, which is based on and claims the benefit of a Chinese patent application No. 201910256652.4, filed on Apr. 1, 2019, in the Chinese Intellectual Property Office, the disclosure of which is incorporated by reference herein in its entirety.

BACKGROUND

1. Field

The disclosure relates to antenna technology. More particularly, the disclosure relates to a radiating element of an antenna and an antenna to which the radiating element is applied.

2. Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post long term evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, coordinated multi-points (CoMP), reception-end interference cancellation and the like.

In the 5G system, Hybrid frequency shift keying (FSK) and quadrature amplitude modulation (QAM) (FOAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

An antenna vibrator is the most widely used form of base station antennas, accounting for more than 80% of base stations. Most of existing antenna vibrators include following forms: a die-cast vibrator, a printed vibrator, a printed circuit board (PCB) patch vibrator, and a combination sheet metal vibrator. In this case, the height of a radiator (also referred to as "vibrator" including a vibrator radiating arm and a vibrator balun) used in a radiating element of an existing antenna is usually set to a quarter of a wavelength, and thus the volume of the vibrator is large.

The hot shrinkage deformation and weight of the die-cast vibrator has always been a serious constraint problem. In addition, the die-cast vibrator requires mold manufacturing, and is manufactured with low precision and poor consistency.

The bandwidth of the printed vibrator is narrow. In order to widen the bandwidth, it is often necessary to add a metal pillar at an end corner of the vibrator, which not only increases the manufacturing process and cost, but also has low precision and poor consistency.

The PCB patch vibrator requires sacrificing isolation under the premise of size reduction. It is necessary to increase isolation, which leads to an increase in the overall weight and volume of the antenna.

Although the weight of the combination sheet metal vibrator is lighter, an assembly process is complicated and it is not easy to implement surface mount technology (SMT) assembly.

It can be seen that the existing various antenna vibrators cannot address the issues of large size, medium weight, narrow bandwidth and poor isolation at the same time, so that they cannot adapt to requirements of 5G-MIMO (the fifth generation mobile communication technology—multiple input and multiple output antenna).

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a communication method and system for converging a $5^{th}$ generation (5G) communication system for supporting higher data rates beyond a $4^{th}$ generation (4G) system.

Additional aspects will be set forth in part in the description which follows and, in part, will be apparent from the description, or may be learned by practice of the presented embodiments.

In accordance with an aspect of the disclosure, a radiating element of an antenna is provided. The radiating element includes a vibrator radiating circuit board, wherein vibrator radiating arms arranged in pairs are printed on the vibrator radiating circuit board, a width of the vibrator radiating arms is less than one-half of a wavelength, a vibrator balun circuit board, configured to support the vibrator radiating circuit board, wherein a vibrator balun is printed on the vibrator balun circuit board, a height of the vibrator balun is at least less than one-fifth of the wavelength, the vibrator balun comprises at least one first slot.

Optionally, the first slot extends in a horizontal direction and/or a vertical direction.

Optionally, the width of the vibrator radiating arms is one-third of the wavelength, the height of the vibrator balun is one-tenth of the wavelength to one-eighth of the wavelength.

Optionally, a bottom edge of the vibrator balun comprises a pair of first grounding points, and there is a first distance from the first grounding points to a center of the bottom edge of the vibrator balun.

Optionally, the first distance is one-sixth of the wavelength.

Optionally, the center of the bottom edge of the vibrator balun comprises a second grounding point.

Optionally, two ends of a top edge of the vibrator balun circuit board respectively comprise a separate first metallized pillar, the first metallized pillar extends towards the vibrator radiating circuit board, the vibrator balun circuit board is electrically connected to the vibrator radiating circuit board via the first metallized pillar.

Optionally, each vibrator radiating arm comprises a hollow, and an inner convex metallized sheet extending from the end corner of the vibrator radiating arm toward inside of the hollow.

Optionally, each inner convex metallized sheet comprises a second slot, a position of the first metallized pillar corresponds to a position of the second slot, and each first metallized pillar is inserted into the second slot.

Optionally, there is a pair of second metallized pillars at a middle portion of a top edge of the vibrator balun circuit board, the second metallized pillars extend toward the vibrator radiating circuit board, the vibrator balun circuit board is electrically connected to the vibrator radiating circuit board through the second metallized pillars.

In accordance with another aspect of the disclosure, an antenna is provided. The antenna includes a reflecting plate, and the radiating element as described above, wherein the radiating element is mounted on the reflecting plate, the antenna comprises at least two radiating elements, the reflecting plate is formed with a feed network, and the at least two radiating elements are electrically connected to each other through the feed network.

It can be seen from the above technical solutions that, the radiating element in the embodiment includes only two kinds of printed circuit boards (PCBs), so that the assembly of the radiating element may be realized by PCB assembly and welding without opening a mold, thereby facilitating SMT mass production to simplify assembly time and improve working efficiency.

Further, by providing the first slot on the vibrator balun and further moving the grounding point outward, the bandwidth of the radiating element may be extended, which realizes a quarter of the electrical length at a height of one-tenth of the wavelength, so as to reduce the height of the vibrator balun.

The thickness of the radiating element may be reduced by reducing the height of the vibrator balun. A plane area occupied by the radiating element may be reduced by reducing the width of the vibrator radiating arm. It can be seen that the radiating element of the embodiment may reduce the volume of the radiating element of the antenna in two dimensions, thus a reduction effect is more obvious.

Therefore, the volume of the radiating element may be reduced in the form of PCB, which may comprehensively combine advantages of the die-cast vibrator and the PCB patch vibrator, and achieve a wide bandwidth, good isolation, and a high gain.

In addition, the antenna surface-extending bandwidth may be reduced by adding the first metallized pillar on the vibrator balun circuit board and adding the inner convex metallized sheet on the vibrator radiating circuit board without increasing the manufacturing cost and process. The first metallized pillar is integrally formed with the vibrator balun circuit board, and is electrically connected to the vibrator radiating arm of the vibrator radiating circuit board, which achieves the same effect as welding the metal pillar additionally. However, compared with the prior art, the cost and process may not be increased.

As can be seen from the embodiments described above, the volume occupied by the radiating element of the antenna is significantly reduced by the two dimensions of height and width. Moreover, by the arrangement of the first metallized pillar and the inner convex metallized sheet, the deterioration of the antenna performance due to the reduction in size may be appropriately compensated. For example, the first metallized pillar may adjust a low frequency standing wave ratio, improve a cross polarization ratio, and extend an impedance bandwidth, while the inner convex metallized sheet may extend the low frequency bandwidth to achieve a good standing wave ratio and improve the impedance bandwidth and isolation.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms “a,” “an,” and “the” include plural referents unless the context clearly dictates otherwise. Thus, for example, reference to “a component surface” includes reference to one or more of such surfaces.

In order to support reduction of the volume of an antenna, following embodiments are intended to reduce the thickness of the antenna by reducing the height of a radiator, which makes the antenna slimmer. At the same time, the embodiments described below also provide compensation for loss of antenna performance due to the reduced height of the radiator. Preferably, the compensation may at least cause the antenna to meet a performance requirement of a base station or a micro base station.

Figure 1:
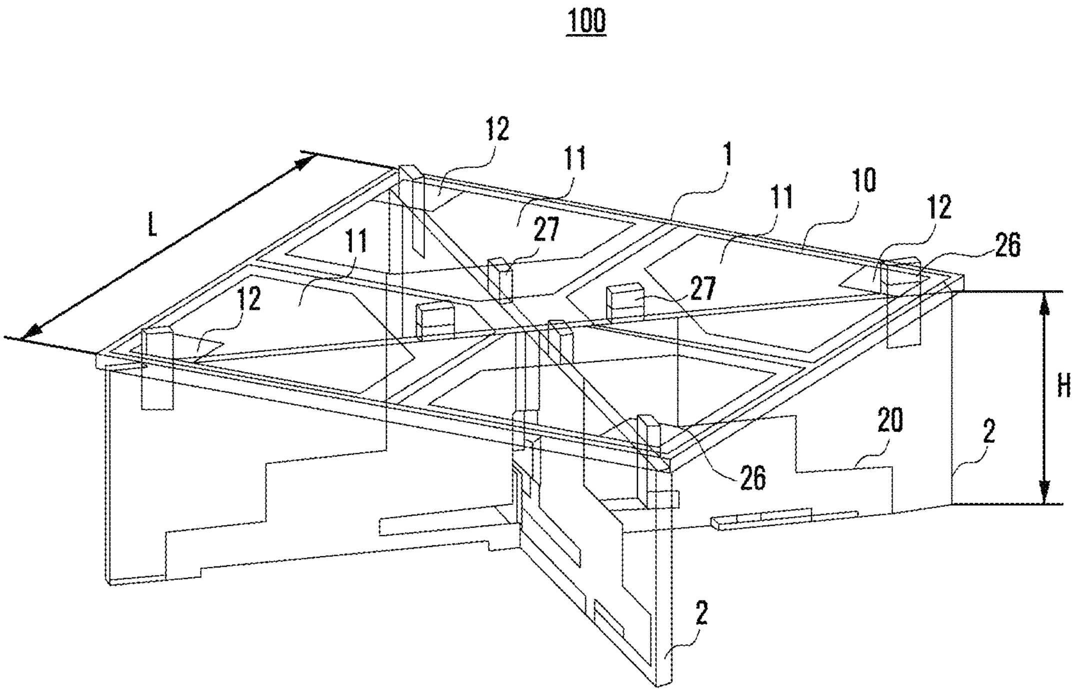
FIG. 1 is a perspective view of a radiating element according to an embodiment of the disclosure.
Figure 2:
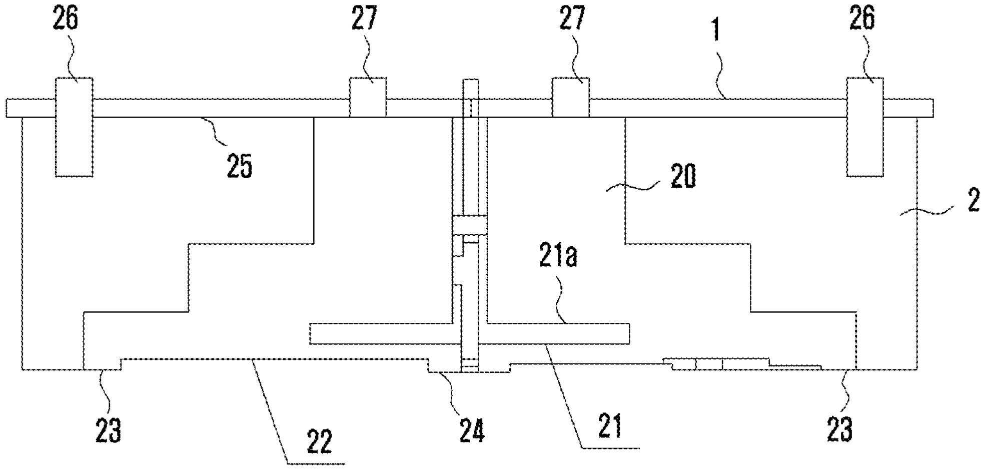
FIG. 2 is a plan view of a vibrator balun circuit board according to an embodiment of the disclosure.
Figure 3:
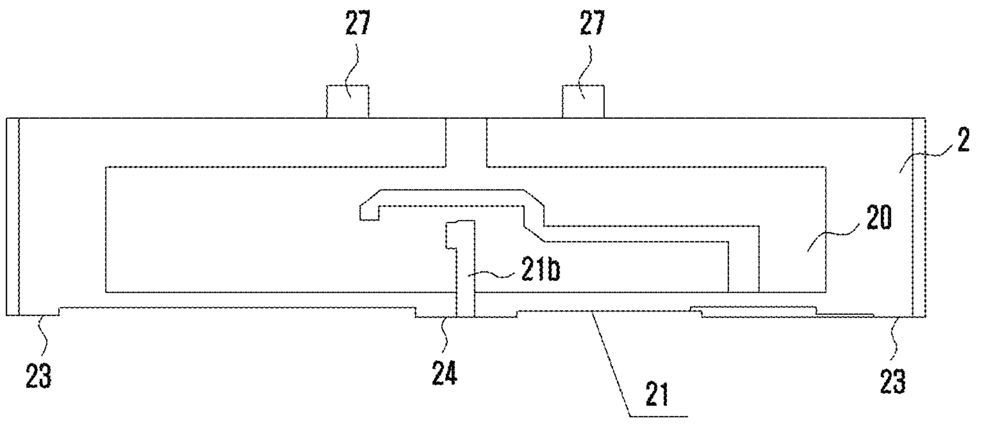
FIG. 3 is a plan view of a vibrator balun circuit board according to an embodiment of the disclosure.

FIG. 1 is a perspective view of a radiating element in according to an embodiment of the disclosure. FIGS. 2 and 3 are plan views of a vibrator balun circuit board according to two according to various embodiments of the disclosure.

Referring to FIGS. 1 to 3, in an embodiment of the disclosure, a radiating element 100 of an antenna includes a vibrator radiating circuit board 1 and a vibrator balun circuit board 2. A radiator of the radiating element 100 includes vibrator radiating arms 10 and a vibrator balun 20. The vibrator radiating arms 10 are arranged in pairs, which are printed on the vibrator radiating circuit board 1. The vibrator balun 20 is printed on the vibrator balun circuit board 2. In this case, the vibrator balun circuit board 2 is vertically disposed below the vibrator radiating circuit board 1 to support the vibrator radiating circuit board 1 to extend in a horizontal direction.

A width L of the vibrator radiating arms 10 is less than one-half of a wavelength (see FIG. 1). Preferably, the vibrator radiating arms 10 are set to one-third of the wavelength in this embodiment. A height H of the vibrator balun 20 is at least less than one-fifth of the wavelength (see FIG. 1). Preferably, the height H of the vibrator balun 20 is set to one-tenth of the wavelength to one-eighth of the wavelength in this embodiment.

As shown in FIGS. 2 and 3, the vibrator balun 20 includes at least one first slot 21. The first slot 21 is configured to load capacitive and inductive to extend the bandwidth of the radiating element 100 with the width L of the vibrator radiating arms 10 decreasing and the height H of the vibrator balun 20 decreasing, so that a transmission effect with the reduced width L and the reduced height H is the same as a transmission effect with a width of one-half of the wavelength and an electrical length of a quarter of the wavelength.

Further, the radiating element in this embodiment includes only two kinds of printed circuit boards (PCBs), so that the assembly of the radiating element may be realized by PCB assembly and welding without opening a mold, thereby facilitating SMT mass production to simplify assembly time and improve working efficiency.

As shown in FIG. 1, the vibrator radiating arms 10 may be plural, which are realized by a metal piece. The plurality of the vibrator radiating arms 10 are in a same plane. The vibrator radiating arms 10 are disposed in pairs. In the embodiment of the disclosure, the vibrator radiating arms 10 are disposed in two pairs, and the two pairs of the vibrator radiating arms are perpendicular to each other. In this case, the so-called pair arrangement may be symmetrically distributed for each pair of the vibrator radiating arms 10.

The vibrator balun circuit board 2 where the vibrator balun 20 is located supports the vibrator radiating circuit board 1 where the vibrator radiating arms 10 are located. Corresponding to the case where the vibrator radiating arms 10 are disposed in two pairs, as shown in FIG. 1, there are two vibrator balun circuit boards 2. The two vibrator balun circuit boards 2 are vertically disposed to intersect each other to form a stable cross support structure, in which each vibrator balun circuit board 2 correspondingly supports a pair of vibrator radiating arms 10.

Alternatively, the two vibrator balun circuit boards 2 are identical in shape, but the structure of the vibrator balun 20 printed thereon may be selected to be identical or different.

Alternatively, the first slot 21 extends in a horizontal direction and/or a vertical direction.

Referring to FIG. 2, the vibrator balun 20 may include a first slot 21*a* extending in the horizontal direction.

Referring to FIG. 3, the vibrator balun 20 may include a first slot 21*b* extending in the vertical direction. It can be understood that the vibrator balun 20 may also simultaneously include the first slot 21*a* extending in the horizontal direction and the first slot 21*b* extending in the vertical direction to correspondingly load capacitive and inductive according to antenna performance.

Alternatively, as shown in FIGS. 2 and 3, a bottom edge 22 of the vibrator balun 20 includes a pair of first grounding points 23. There is a first distance from the first grounding points 23 to a center of the bottom edge 22 of the vibrator balun 20. Alternatively, the first distance is one-eighth of the wavelength.

Generally, a grounding point of the vibrator balun is set at a center position. In the embodiment of the disclosure, the bandwidth of the radiating element 100 may be extended by moving the grounding point outward to form the pair of the first grounding points with the first distance from the central position, which realizes a quarter of the electrical length at a height of one-tenth of the wavelength, so as to reduce the height of the vibrator balun 20.

Alternatively, the center of the bottom edge 22 of the vibrator balun 20 includes a second grounding point 24.

It can be seen from the above scheme that by providing the first slot 21 on the vibrator balun 20 and further moving the grounding point outward, the bandwidth of the radiating element 100 may be extended, which realizes a quarter of the electrical length at a height of one-tenth of the wavelength, so as to reduce the height of the vibrator balun 20.

The thickness of the radiating element may be reduced by reducing the height of the vibrator balun. A plane area occupied by the radiating element may be reduced by reducing the width of the vibrator radiating arm. It can be seen that the radiating element of the embodiment may reduce the volume of the radiating element of the antenna in two dimensions, thus a reduction effect is more obvious.

Alternatively, as shown in FIG. 1 to FIG. 3, two ends of a top edge 25 of the vibrator balun circuit board 2 respectively include a separate first metallized pillar 26. The first metallized pillar 26 extends from the top edge 25 of the vibrator balun circuit board 2 towards the vibrator radiating circuit board 1. The vibrator balun circuit board 2 is electrically and physically connected to the vibrator radiating circuit board 1 via the first metallized pillar 26.

The first metallized pillar 26 may be a protrusion formed at the top edge 25 of the vibrator balun circuit board 2, the surface of which is covered with metal. In addition, the separate first metallized pillar 26 means that the first metallized pillar 26 is isolated from the vibrator balun 20 printed on the vibrator balun circuit board 2.

In the prior art, in order to reduce the antenna spread width, an additional metal pillar is usually added to the vibrator radiating arm to extend the length of the vibrator radiating arm. The metal pillar is usually added by adding a process of welding the metal pillar during assembly. Therefore, the precision is poor, the consistency is not good, the assembly process is cumbersome, and mass production may not be achieved. In the embodiment of the disclosure, the first metallized pillar 26 is integrally formed with the vibrator balun circuit board 2, and is electrically connected to the vibrator radiating arm 10 of the vibrator radiating circuit board 1, which achieves the same effect as welding the metal pillar additionally. However, compared with the prior art, the cost and process may not be increased.

Alternatively, as shown in FIG. 1, each vibrator radiating arm 10 includes a hollow 11, and an inner convex metallized sheet 12 extending from the end corner of the vibrator radiating arm 10 toward the inside of the hollow 11. The inner convex metallized sheet 12 is a sheet-like structure extending from the end corner of the vibrator radiating arm 10 toward the center of the pair of the vibrator radiating arms, and a shape thereof may be selected as a square shape for extending the length of the vibrator radiating arm 10, so as to extend a low frequency bandwidth. Since the inner convex metallized sheet 12 extends toward the inside of the pair of the vibrator radiating arms 10, the width L of the vibrator radiating arms 10 is not increased, but the size of the vibrator radiating arms 10 is reduced, under the premise of extending the low frequency bandwidth.

As can be seen from the embodiments described above, the volume occupied by the radiating element of the antenna is significantly reduced by the two dimensions of height and width. Moreover, by the arrangement of the first metallized pillar and the inner convex metallized sheet, the deterioration of the antenna performance due to the reduction in size may be appropriately compensated. For example, the first metallized pillar may adjust a low frequency standing wave ratio, improve a cross polarization ratio, and extend an impedance bandwidth, while the inner convex metallized sheet may extend the low frequency bandwidth to achieve a good standing wave ratio and improve the impedance bandwidth and isolation.

Alternatively, each inner convex metallized sheet 12 includes a second slot (not shown in the figures). The position and shape of the first metallized pillar 26 correspond to a position and a shape of the second slot. Each first metallized pillar 26 is inserted into a corresponding second slot. The vibrator radiating circuit board 1 and the vibrator balun circuit board 2 are electrically and physically connected by, for example, welding.

Alternatively, the length of the first metallized pillar 26 is selected such that when inserted into the corresponding second slot, the first metallized pillar 26 protrudes from the vibrator radiating circuit board 1.

Alternatively, as shown in FIG. 1 to FIG. 3, there is a pair of second metallized pillars 27 at a middle portion of a top edge 25 of the vibrator balun circuit board 2. The second metallized pillars 27 extend toward the vibrator radiating circuit board 1. The vibrator balun circuit board 2 is electrically and physically connected to the vibrator radiating circuit board 1 through the second metallized pillars 27.

It can be seen from the above technical solutions that, the radiating element in the embodiment includes only two kinds of printed circuit boards (PCBs), so that the assembly of the radiating element may be realized by PCB assembly and welding without opening a mold, thereby facilitating SMT mass production to simplify assembly time and improve working efficiency.

Further, by providing the first slot on the vibrator balun and further moving the grounding point outward, the bandwidth of the radiating element may be extended, which realizes a quarter of the electrical length at a height of one-tenth of the wavelength, so as to reduce the height of the vibrator balun.

The thickness of the radiating element may be reduced by reducing the height of the vibrator balun. A plane area occupied by the radiating element may be reduced by reducing the width of the vibrator radiating arm. It can be seen that the radiating element of the embodiment may reduce the volume of the radiating element of the antenna in two dimensions, thus a reduction effect is more obvious.

Therefore, the volume of the radiating element may be reduced in the form of PCB, which may comprehensively combine advantages of the die-cast vibrator and the PCB patch vibrator, and achieve a wide bandwidth, good isolation, and a high gain.

In addition, the antenna surface-extending bandwidth may be reduced by adding the first metallized pillar on the vibrator balun circuit board and adding the inner convex metallized sheet on the vibrator radiating circuit board without increasing the manufacturing cost and process. The first metallized pillar is integrally formed with the vibrator balun circuit board, and is electrically connected to the vibrator radiating arm of the vibrator radiating circuit board, which achieves the same effect as welding the metal pillar additionally. However, compared with the prior art, the cost and process may not be increased.

As can be seen from the embodiments described above, the volume occupied by the radiating element of the antenna is significantly reduced by the two dimensions of height and width. Moreover, by the arrangement of the first metallized pillar and the inner convex metallized sheet, the deterioration of the antenna performance due to the reduction in size may be appropriately compensated. For example, the first metallized pillar may adjust a low frequency standing wave ratio, improve a cross polarization ratio, and extend an impedance bandwidth, while the inner convex metallized sheet may extend the low frequency bandwidth to achieve a good standing wave ratio and improve the impedance bandwidth and isolation.

Another embodiment of the disclosure further provides an antenna, including a reflecting plate, and the radiating element 100 as described above. The radiating element 100 is mounted on the reflecting plate. The antenna includes at least two radiating elements 100. The reflecting plate is formed with a feed network. The at least two radiating elements 100 are electrically connected to each other through the feed network.

Figure 4:
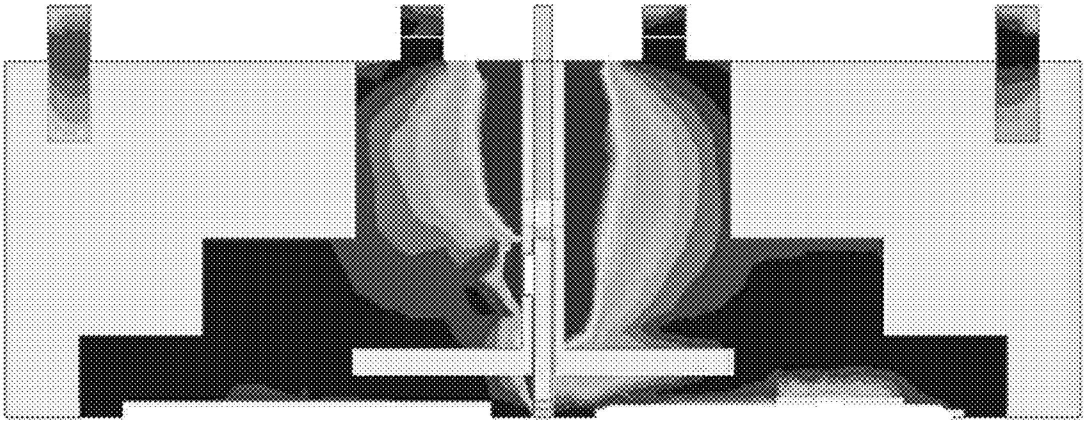
FIG. 4 is a field intensity distribution diagram of the vibrator balun circuit board of FIG. 2 according to an embodiment of the disclosure.

FIG. 4 is a field intensity distribution diagram of the vibrator balun circuit board of FIG. 2 according to an embodiment of the disclosure.

Figure 5A:
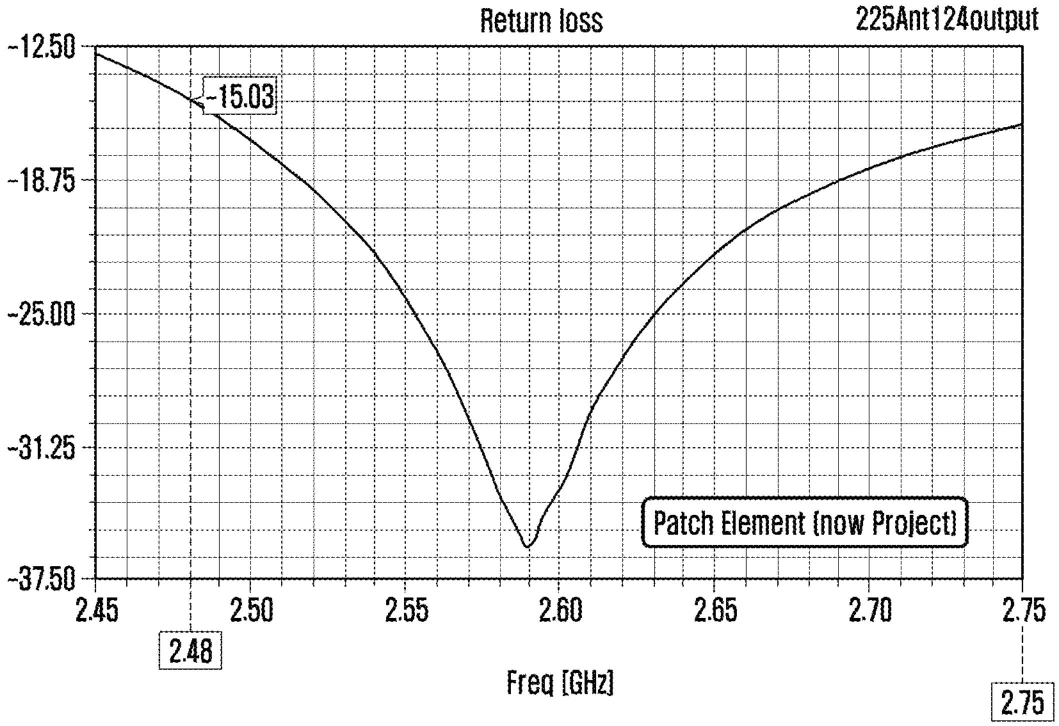
FIG. 5A is a bandwidth distribution diagram of an existing antenna vibrator according to an embodiment of the disclosure.

FIG. 5A is a bandwidth distribution diagram of an existing antenna vibrator according to an embodiment of the disclosure.

Figure 5B:
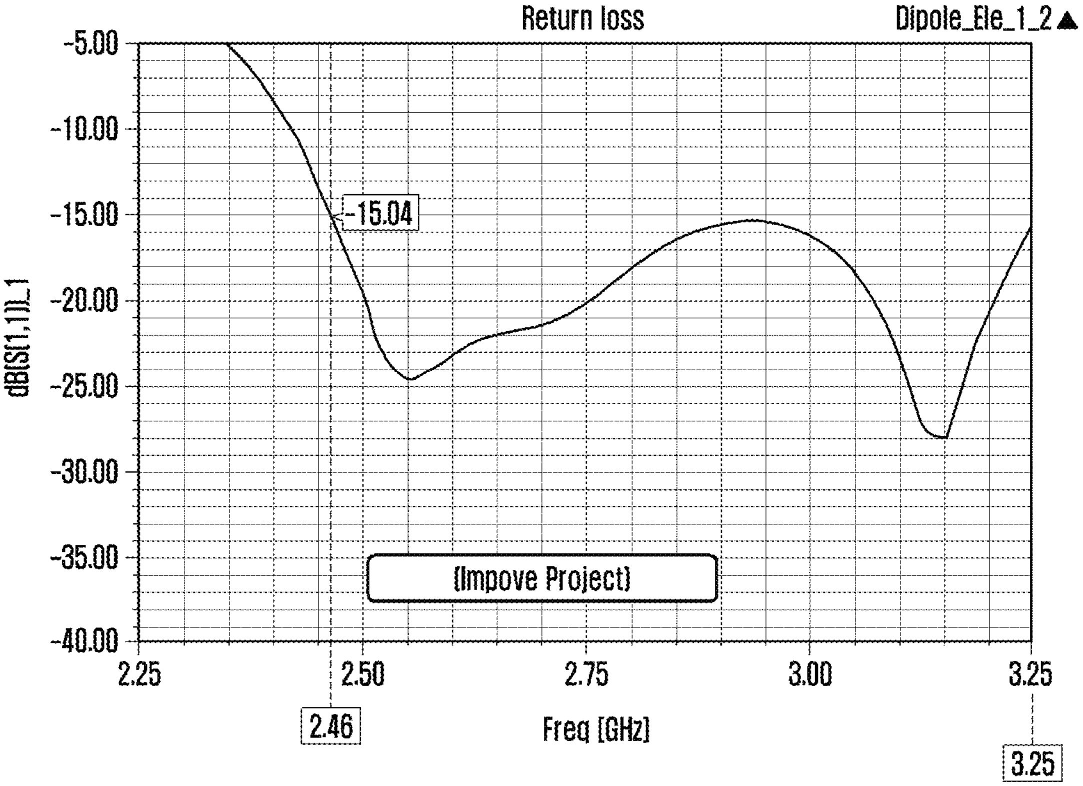
FIG. 5B is a bandwidth distribution diagram of an antenna vibrator according to an embodiment of the disclosure.

FIG. 5B is a bandwidth distribution diagram of an antenna vibrator according to an embodiment of the disclosure.

Referring to FIGS. 4, 5A, and 5B, the antenna of the embodiment may significantly extend the bandwidth by employing the radiating element as described above. FIG. 5A shows that an existing antenna bandwidth with a height of a quarter of the wavelength is close to 400 MHz. An antenna bandwidth of the embodiment shown in FIG. 5B is close to 800 MHz.

Figure 6A:
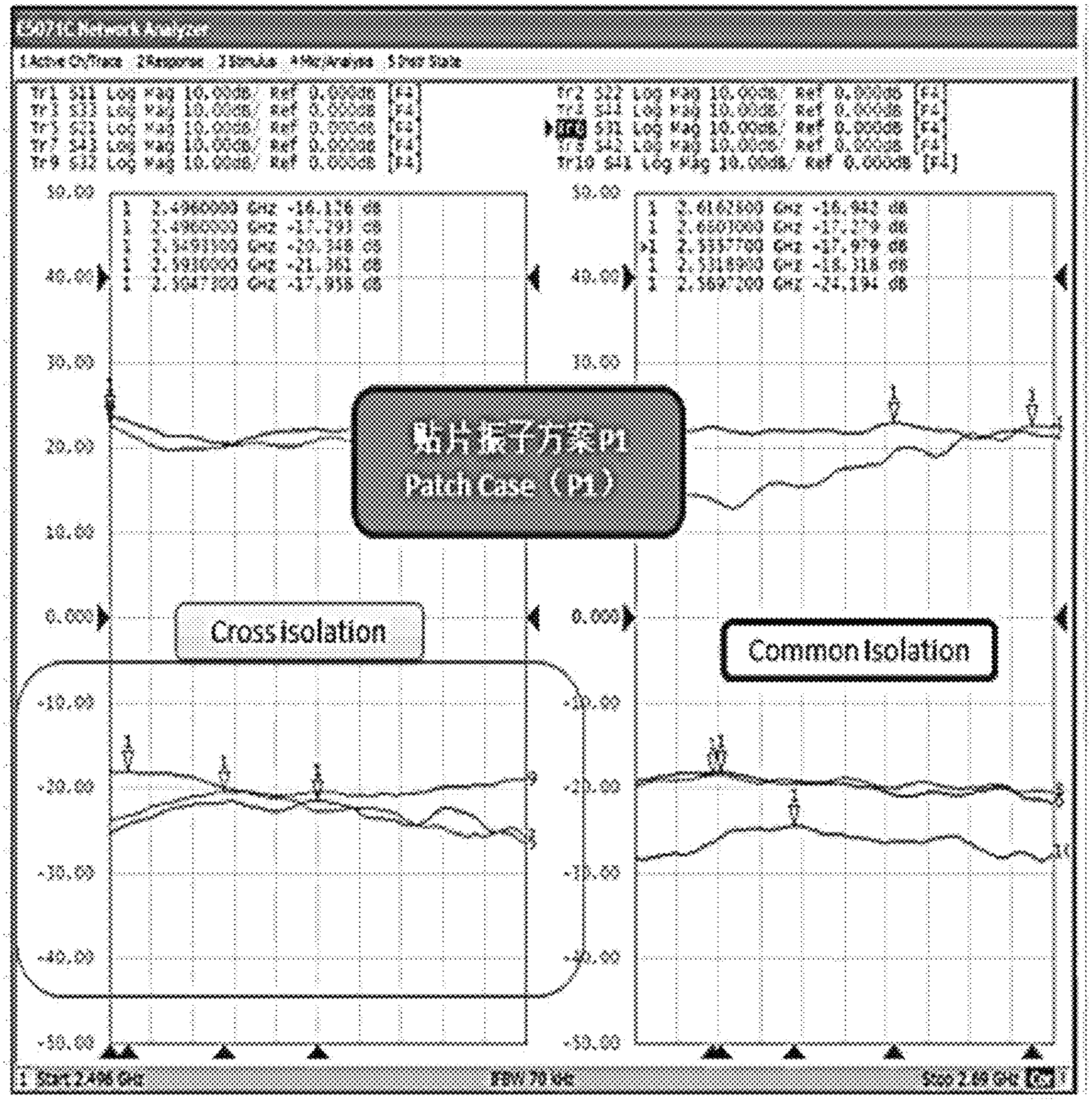
FIG. 6A is a schematic diagram illustrating isolation of an existing antenna vibrator according to an embodiment of the disclosure.

FIG. 6A is a schematic diagram illustrating isolation of an existing antenna vibrator according to an embodiment of the disclosure.

Figure 6B:
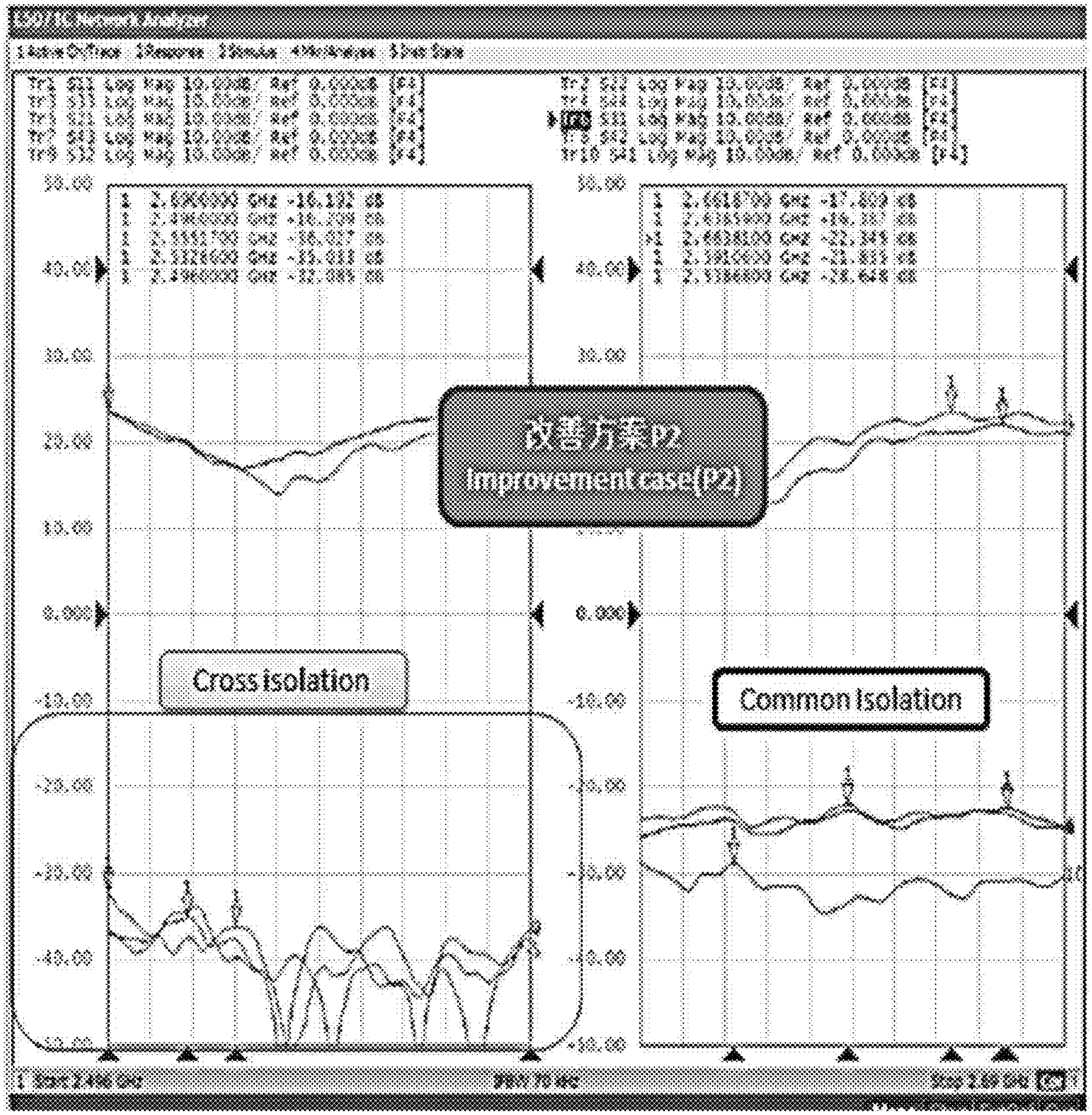
FIG. 6B is a schematic diagram illustrating isolation of an antenna vibrator according to an embodiment of the disclosure.

FIG. 6B is a schematic diagram illustrating isolation of an antenna vibrator according to an embodiment of the disclosure.

Further, the antenna of the embodiment has the advantages of light weight, small size, high precision, mass production by SMT, good isolation, and high gain, which is suitable for a large array antenna required by 5G-MIMO (the fifth generation mobile communication technology—multiple input and multiple output antenna).

Referring to FIGS. 6A and 6B, compared with the 2.5G (the 2.5th generation mobile communication technology) patch vibrator antenna scheme shown in FIG. 6A, the isolation of the antenna of the embodiment shown in FIG. 6B is significantly improved. Co-polarization isolation is increased by 3~4 dB, and hetero-polarization isolation is increased by 6~10 dB. In a specific case, a lateral isolation boundary may be greatly reduced.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A radiating element of an antenna, the radiating element comprising:
- a radiating circuit board, wherein radiating arms arranged in pairs are printed on the radiating circuit board, and a width of the radiating arms is less than one-half of a wavelength; and
- a balun circuit board, configured to support the radiating circuit board,
- wherein a balun is printed on the balun circuit board,
- wherein a height of the balun is at least less than one-fifth of the wavelength, and
- wherein the balun comprises at least one first slot.

2. The radiating element of claim 1, wherein the first slot extends in a horizontal direction and/or a vertical direction.

3. The radiating element of claim 1,
- wherein the width of the radiating arms is one-third of the wavelength, and
- wherein the height of the balun is one-tenth of the wavelength to one-eighth of the wavelength.

4. The radiating element of claim 1,
- wherein a bottom edge of the balun comprises a pair of first grounding points, and
- wherein there is a first distance from the pair of first grounding points to a center of the bottom edge of the balun.

5. The radiating element of claim 4, wherein the first distance is one-sixth of the wavelength.

6. The radiating element of claim 4, wherein the center of the bottom edge of the vibrator balun comprises a second grounding point.

7. The radiating element of claim 4,
- wherein two ends of a top edge of the balun circuit board respectively comprise a separate first metallized pillar,
- wherein the first metallized pillar extends towards the radiating circuit board, and
- wherein the balun circuit board is electrically connected to the radiating circuit board via the first metallized pillar.

8. The radiating element of claim 7,
- wherein each radiating arm comprises a hollow, and
- wherein an inner convex metallized sheet extending from an end corner of the radiating arm toward inside of the hollow.

9. The radiating element of claim 8,
- wherein each inner convex metallized sheet comprises a second slot,
- wherein a position of the first metallized pillar corresponds to a position of the second slot, and
- wherein each first metallized pillar is inserted into the second slot.

10. The radiating element of claim 7,
- wherein there is a pair of second metallized pillars at a middle portion of a top edge of the balun circuit board,
- wherein the pair of second metallized pillars extend toward the radiating circuit board, and
- wherein the balun circuit board is electrically connected to the radiating circuit board through the pair of second metallized pillars.

11. An antenna comprising:
- a reflecting plate; and
- a radiating element comprising:
  - a radiating circuit board, wherein radiating arms arranged in pairs are printed on the radiating circuit board, and a width of the radiating arms is less than one-half of a wavelength, and
  - a balun circuit board, configured to support the radiating circuit board,
- wherein a balun is printed on the balun circuit board,
- wherein a height of the balun is at least less than one-fifth of the wavelength,
- wherein the balun comprises at least one first slot,
- wherein the radiating element is mounted on the reflecting plate,
- wherein the antenna comprises at least two radiating elements,
- wherein the reflecting plate is formed with a feed network, and
- wherein the at least two radiating elements are electrically connected to each other through the feed network.

12. The antenna of claim 11,
- wherein a bottom edge of the balun comprises a pair of first grounding points, and
- wherein there is a first distance from the pair of first grounding points to a center of the bottom edge of the balun.

13. The antenna of claim 12,
- wherein two ends of a top edge of the balun circuit board respectively comprise a separate first metallized pillar,
- wherein the first metallized pillar extends towards the radiating circuit board, and
- wherein the balun circuit board is electrically connected to the radiating circuit board via the first metallized pillar.

14. The antenna of claim 13,
- wherein each radiating arm comprises a hollow, and an inner convex metallized sheet extending from an end corner of the radiating arm toward inside of the hollow,
- wherein each inner convex metallized sheet comprises a second slot,
- wherein a position of the first metallized pillar corresponds to a position of the second slot, and
- wherein each first metallized pillar is inserted into the second slot.

15. The antenna of claim 13,
- wherein there is a pair of second metallized pillars at a middle portion of a top edge of the balun circuit board, wherein the pair of second metallized pillars extend toward the radiating circuit board, and wherein the balun circuit board is electrically connected to the radiating circuit board through the pair of second metallized pillars.

16. The antenna of claim 12, wherein the first distance is one-sixth of the wavelength.

17. The antenna of claim 12, wherein the center of the bottom edge of the balun comprises a second grounding point.

18. The antenna of claim 11, wherein the first slot extends in a horizontal direction and/or a vertical direction.

19. The antenna of claim 11, wherein the width of the radiating arms is one-third of the wavelength, and wherein the height of the balun is one-tenth of the wavelength to one-eighth of the wavelength.

* * * * *